Figure 1:
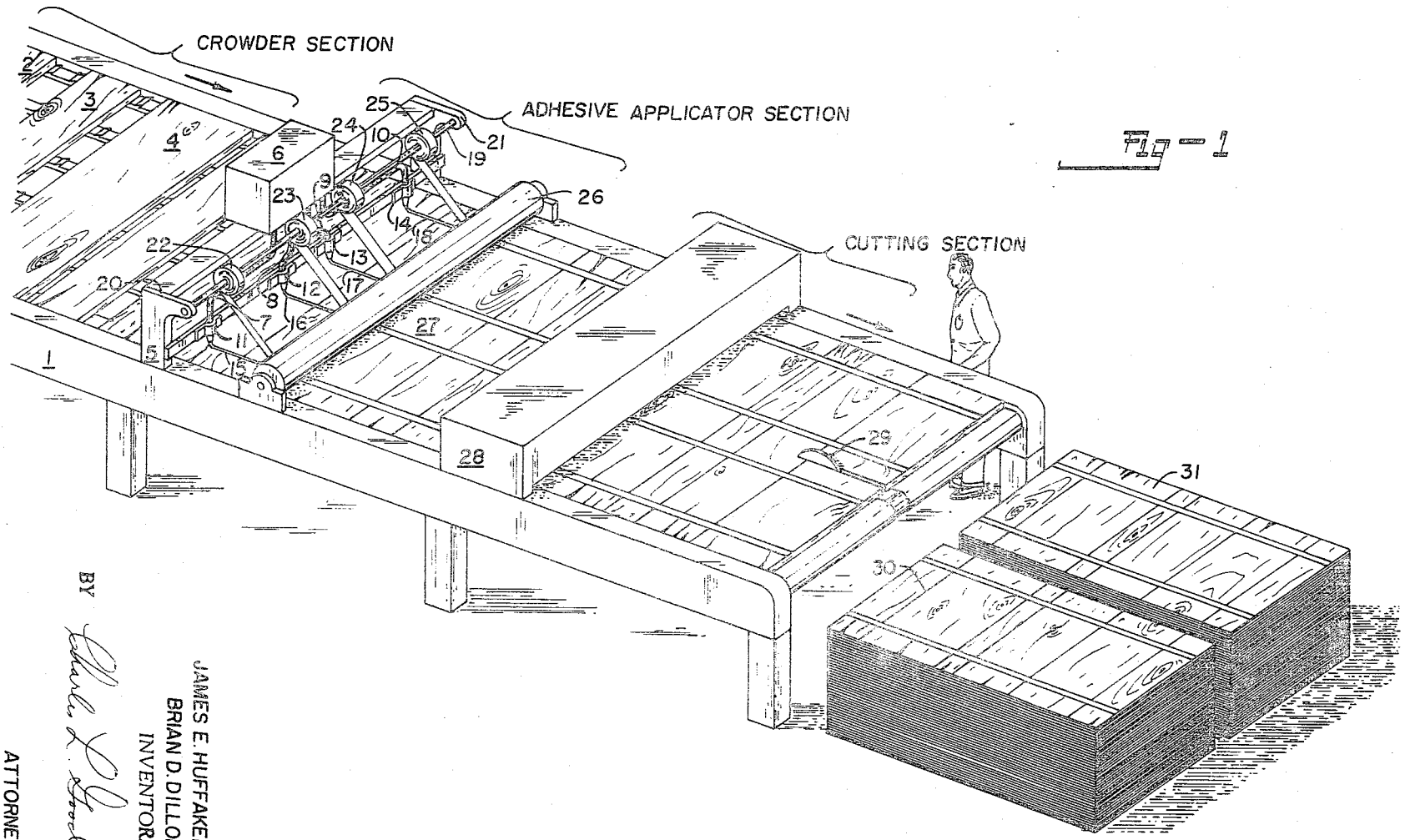
Figure 3:
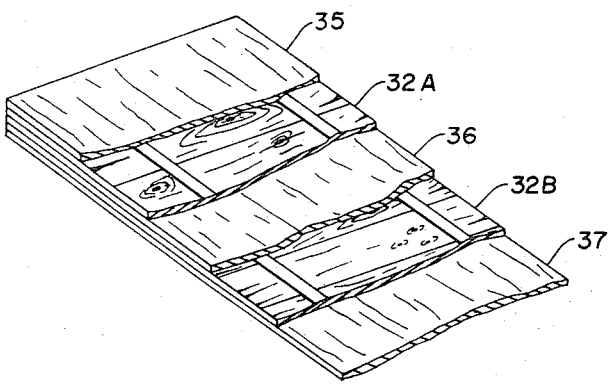
Figure 2:
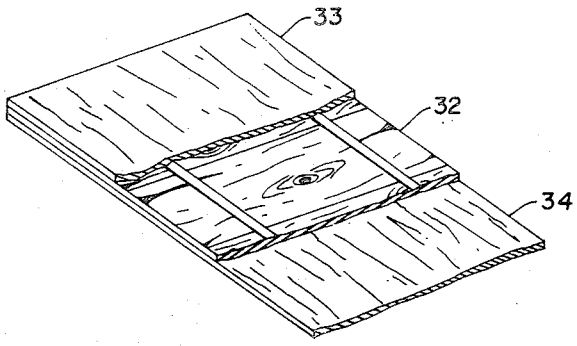

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 18

T896,014

METHOD OF MAKING PLYWOOD CORES

James Edward Huffaker, 1117 Radcliffe 37664, and Brian Douglas Dillon, 2120 Gary St. 37660, both of Kingsport, Tenn.

Filed Jan. 11, 1971, Ser. No. 105,397
Int. Cl. B32b *5/12*
U.S. Cl. 161—60
2 Sheets Drawing. 19 Pages Specification

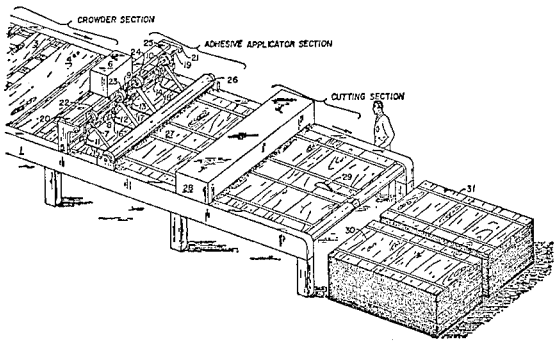

Method of making plywood veneer cores or sheets by continuously bringing a succession of thin random with wood veneer sections of substantially the same length into edge-to-edge contact, extruding a plurality of continuous beads of a hot melt adhesive onto the upper surface of each of the abutting sections and simultaneously pressing a strong, porous paper tape onto each of the adhesive beads in such a manner that the adhesive is caused to adhere to the undersurface of each tape, whereby strong adhesive bonds are formed between each of the tapes and the underlying surfaces of each of the sections. Alternatively, the tapes may be precoated with the adhesive and continuously applied to the sections with the adhesive side down and the adhesive melted and reactivated in situ by pressing the tape into contact with the sections by means of a heated roll. In either case the resulting product is a multi-section thin veneer core sheet which unexpectedly has sufficient strength and other desirable properties to enable it to be cut into 4 x 8 foot sheets or plys for use in standard plywood laminating operations.

March 7, 1972 J. E. HUFFAKER ET AL T896,014

METHOD OF MAKING PLYWOOD CORES

Filed Jan. 11, 1971 2 Sheets-Sheet 1

JAMES E. HUFFAKER
BRIAN D. DILLON
INVENTORS

BY Charles L. Good

ATTORNEY

METHOD OF MAKING PLYWOOD CORES

Filed Jan. 11, 1971 2 Sheets-Sheet 2

JAMES E. HUFFAKER
BRIAN D. DILLON
INVENTORS

BY Charles L. Good

ATTORNEY